(12) United States Patent
Nozaki et al.

(10) Patent No.: US 6,393,766 B2
(45) Date of Patent: *May 28, 2002

(54) SEALING STRUCTURE OF DOOR WEATHER STRIP

(75) Inventors: Masahiro Nozaki, Tsushima; Yasushi Mizutani, Ichinomiya, both of (JP)

(73) Assignee: Toyoda Gosei Co., Ltd., Aichi-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 38 days.

(21) Appl. No.: 09/472,981

(22) Filed: Dec. 28, 1999

(30) Foreign Application Priority Data

Dec. 28, 1998 (JP) .......................... 10-372216

(51) Int. Cl.[7] ................................ E06B 7/22
(52) U.S. Cl. ...................... 49/498.1; 49/475.1
(58) Field of Search ................ 49/475.1, 479.1, 49/484.1, 495.1, 498.1

(56) References Cited

U.S. PATENT DOCUMENTS

| 3,927,493 | A | * | 12/1975 | Tsuneishi et al. | 49/476 |
|---|---|---|---|---|---|
| 4,496,186 | A | * | 1/1985 | Tuchiya et al. | 296/146 |
| 4,817,336 | A | * | 4/1989 | Kisanuki | 49/476 |
| 4,858,385 | A | * | 8/1989 | Bright | 49/488 |
| 4,884,370 | A | * | 12/1989 | Nozaki et al. | 49/479 |
| 4,928,431 | A | * | 5/1990 | Kuzuha et al. | 49/479 |
| 5,042,201 | A | * | 8/1991 | Vaughn | 49/482 |
| 5,048,887 | A | * | 9/1991 | Kunishima et al. | 296/146 |
| 5,155,938 | A | * | 10/1992 | Nozaki | 49/441 |
| 5,207,029 | A | * | 5/1993 | Nozaki et al. | 49/495.1 |
| 5,269,101 | A | * | 12/1993 | Nozaki et al. | 49/479.1 |
| 5,581,951 | A | * | 12/1996 | Ryan et al. | 49/498.1 |
| 5,636,895 | A | * | 6/1997 | Ito et al. | 296/146.9 |
| 5,715,632 | A | | 2/1998 | Nozaki | 49/475.1 |
| 5,918,421 | A | | 7/1999 | Nozaki | 49/492.1 |
| 6,131,342 | A | * | 10/2000 | Miyamoto et al. | 49/484.1 |

* cited by examiner

Primary Examiner—Curtis A. Cohen
(74) Attorney, Agent, or Firm—Pillsbury Winthrop LLP

(57) ABSTRACT

A molded corner sealing structure of a door weather strip for attachment along a peripheral surface of a vehicle door including a seal lip for abutment on an inner surface of a door projecting edge which projects around the vehicle door to cover an outer side surface of the door weather strip over the entire length thereof. The door weather strip has an additional secondary seal lip for abutment on the inner surface of the door projecting edge under and along the seal lip. The door weather strip is bonded to a roof-side part and corner part of the vehicle door frame with a double-sided adhesive tape, and is secured to the remaining part of the peripheral surface of the vehicle door with clips. The seal lip and secondary seal lip of the door weather strip in combination effect a double seal in the corner part thereof.

2 Claims, 5 Drawing Sheets

FIG. 2 (A)  (PRIOR ART)
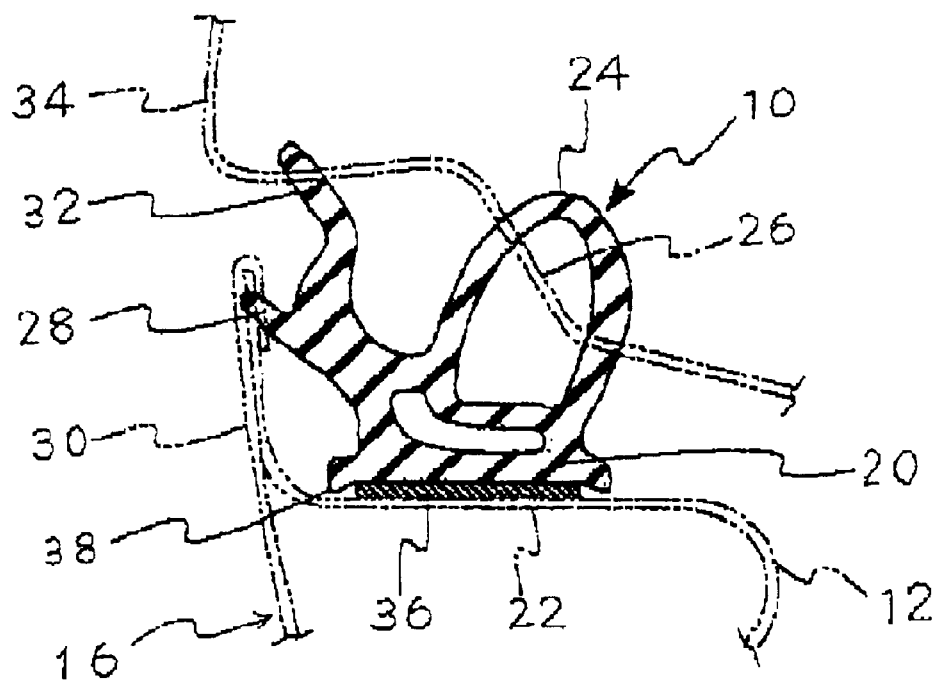
FIG. 2 (B)  (PRIOR ART)
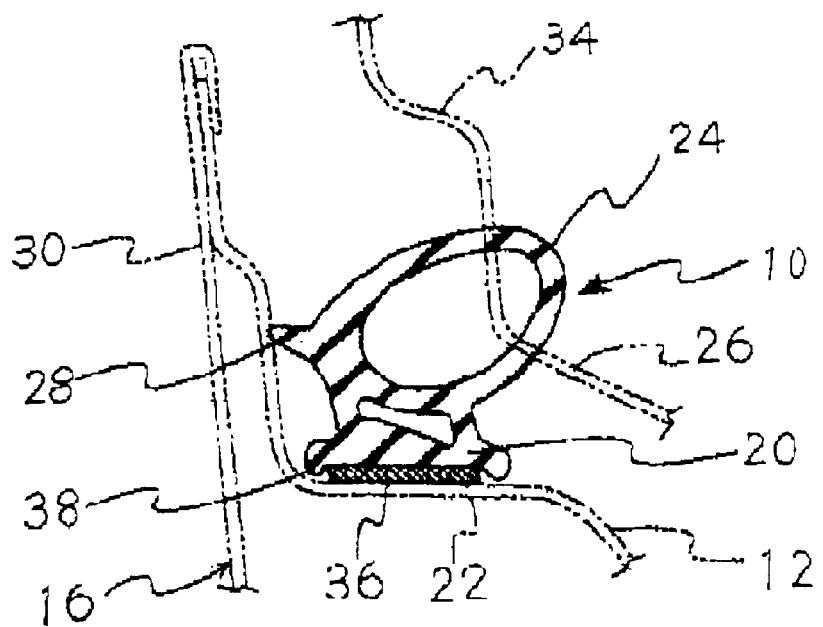

SEALING STRUCTURE OF DOOR WEATHER STRIP

BACKGROUND OF THE INVENTION

This application claims priority from Japanese patent application No. Hei 10-372216; the substance of which is incorporated herein.

1. Field of the Invention

The present invention relates to a sealing structure of a door weather strip, and more particularly to a sealing structure for effecting a seal between the door weather strip and a periphery of a vehicle door, to which the door weather strip is attached.

2. Description of Related Art

As illustrated in FIG. 1, a door weather strip (hereinafter referred to as "weather strip") 10 is continuously attached to a door frame 12 and door panel 14 of a vehicle door 16 over the entire periphery thereof. In the drawing, reference numeral 18 designates a door glass.

As illustrated in FIGS. 2(A) and 2(B), the weather strip 10 includes a base portion 20, tubular main seal portion 24 and seal lip 28. The base portion 20 is attached to a peripheral surface 22 of the door frame 12 and door panel 14 (FIG. 1). The tubular main seal portion 24 comes into pressing contact with a surface 26 around a door opening when the door 16 is closed. The seal lip 28 projects outwardly and abuts an inner surface of a door projecting edge 30 formed around the door frame 12 and door panel 14 (FIG. 1). A roof-side part 10A of the weather strip 10, which is to be attached to a roof-side part 12A of the door frame 12, is further provided with a sub-seal lip 32 which is adapted to come into pressing contact with an outside surface 34 around the door opening when the door 16 is closed.

Conventionally, the weather strip 10 has been attached to the door 16 by securing the base portion 20 to the peripheral surface 22 of the door frame 12 using clips at predetermined intervals.

However, if only clips are used, gaps may exist between the bottom surface of the base portion 20 of the weather strip and peripheral surface 22 of the door frame 12 between the adjacent clips.

In addition, another gap may be generated between the seal lip 28 and the door projecting edge 30 depending on how the weather strip 10 is positioned to the door frame 12. Rain water, washing water or the like may leak into the vehicle compartment through these gaps.

Such water leakage may be prevented by bonding the base portion 20 to the peripheral surface 22 closely with a double-sided adhesive tape 36, as illustrated in FIGS. 2(A) and 2(B).

However, bonding the weather strip 10 with the double-sided adhesive tape (hereinafter referred to as "adhesive tape") 36, requires that the adhesive tape be previously bonded to the base portion 20 of the weather strip 10, and that the base portion 20 be pressed on the peripheral surface 22 of the door frame 14 via the adhesive tape 36 while peeling off a releasing sheet therefrom. Additionally, this bonding work must be carried out carefully so as to not allow the adhesive tape 36 to meander. Thus, troublesome operations are required, and the production costs are increased, as compared to the case using clips.

On the other hand, in the vertical parts of the periphery of the door 16, water which has leaked between the seal lip 28 and door projecting edge 30 flows down along the vertically extending peripheral surface 22 and discharges outside of the vehicle. Therefore, if the weather strip is attached to the vertical parts of the door 16 with clips, leaked water does not enter into the vehicle compartment.

From this fact, the following attaching method would seem possible. The weather strip 10 is attached to the roof-side part 12A and corner part 12C of the door frame 12 with the adhesive tape 36, and is attached to the remaining part of the periphery of the door with clips. With this method, troublesome adhesive tape-bonding operations can be decreased, and the production costs can be reduced, as compared to the method using the adhesive tape over the entire length of the door frame.

However, using the adhesive tape in both the roof-side part 12A and the corner part 12C of the door frame exhibits another problem. The bottom surface of the base portion 20 of the weather strip 10, which is bonded with the adhesive tape 36, is raised from the peripheral surface 22 of the door frame 12 by an amount corresponding to the thickness of the adhesive tape 36. Consequently, a tunnel-like opening 64 is created at an end of the adhesive tape 36 (hereinafter referred as "tape end"), which is located in a vertical side of the corner part 12C between the bottom surface of the base portion 20 and the door frame 12, as shown in FIG. 1. The tunnel-like opening is greater than the gap generated due to the clips so that water flowing down along the peripheral surface 22 of the door frame 12 may partly enter the tunnel-like opening 64, and intrude into the vehicle compartment.

In FIGS. 2(A) and 2(B), the base portion 20 is provided with beads 38 along both side edges thereof. The height of the beads 38 is made less than the thickness of the adhesive tape 36 such that the beads 38 do not abut the peripheral surface 22 of the door frame 12 when the adhesive tape 36 is pressed on the peripheral surface 22 of the door frame 12. Consequently, the beads 38 do not prevent water from leaking into the vehicle compartment through the tunnel-like opening 64.

SUMMARY OF THE INVENTION

Accordingly, it is an object of the present invention to provide a sealing structure of a door weather strip, and more particularly a door weather strip wherein one part is attached to a door frame with a double-sided adhesive tape, and a remaining part is attached to a remaining part of the vehicle door with clips at predetermined intervals, such that water is prevented from leaking into a vehicle compartment through a gap formed between a periphery of the door frame and the door weather strip.

In accordance with an embodiment of the present invention, the base portion of the door weather strip is attached with double-sided adhesive tape to a periphery of a vehicle door so as to be bonded to a roof-side part of a vehicle door frame and a corner part, which curves from the roof-side part to a pillar-side part thereof, and secured to a remaining part of the vehicle door with clips at predetermined intervals.

The weather strip has a seal lip for abutment on an inner surface of a door projecting edge projecting from the periphery of a vehicle door. The seal lip is formed in an outer side surface of the weather strip. The weather strip has a secondary seal lip for abutment on the inner surface of the door projecting edge under and along the above-described seal lip. The secondary seal lip is formed as part of the corner part of the weather strip, which is to be attached to the corner part of the door frame, and surrounds an outer side edge of the base portion.

With the sealing structure of the present invention, water leaking between the seal lip and door peripheral edge is received by the secondary seal lip and flows down along a vertical side of the secondary seal lip instead of being caught in a tunnel-like opening between the base portion of the door weather strip and the door frame along the end of the adhesive tape. Then, water is discharged from a vertical end thereof.

Other objects, features, and characteristics of the present invention will become apparent upon consideration of the following description and the appended claims with reference to the accompanying drawings, all of which form a part of this specification.

BRIEF DESCRIPTION OF THE DRAWINGS

FIG. 2(A) is a cross-sectional view of the conventional weather strip attached to a door frame with a double-sided adhesive tape, which is taken along the line IIA—IIA of FIG. 1;

FIG. 2(B) is a cross-sectional view of the conventional weather strip attached to a door frame with a double-sided adhesive tape, which is taken along the line IIB—IIB of FIG. 1;

DETAILED DESCRIPTION OF THE PREFERRED EMBODIMENTS

Figure 1:
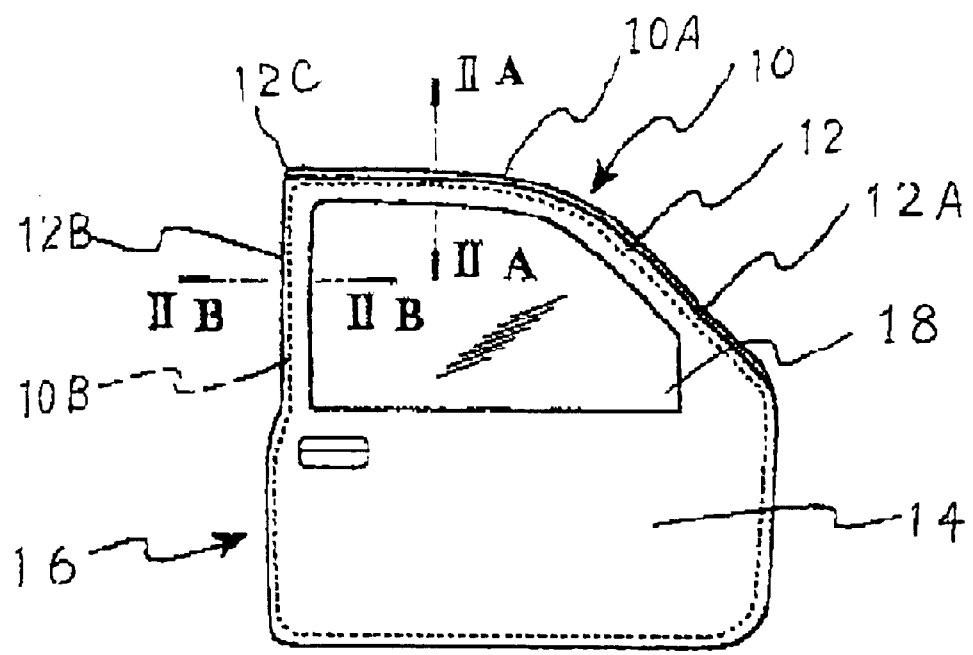
FIG. 1 is a front view of a door to which a conventional weather strip is attached.
Figure 3:
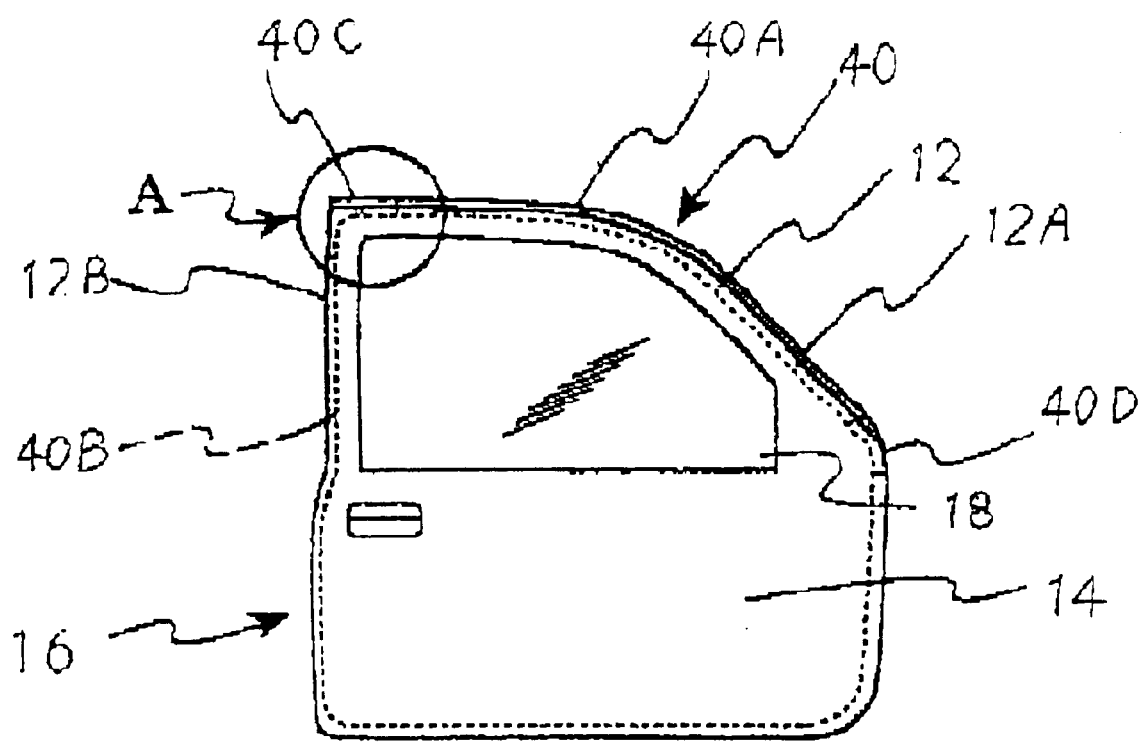
FIG. 3 is a front view of a door to which a weather strip having a sealing structure in accordance with the present invention is attached.
Figure 4:
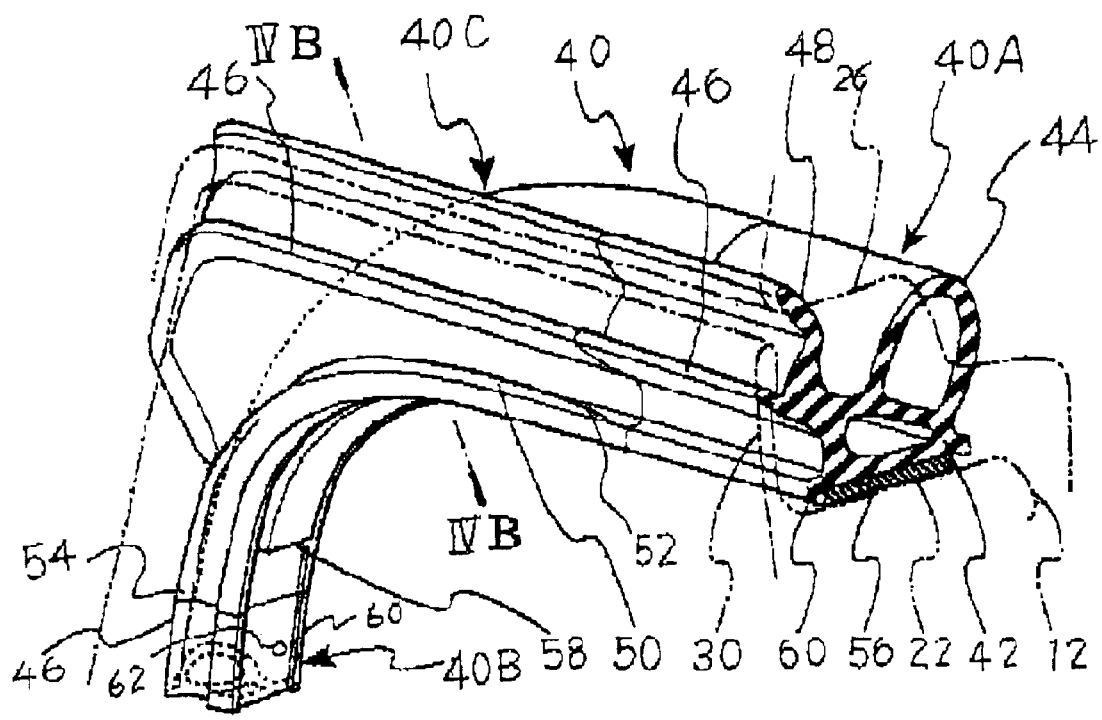
FIG. 4(A) is a perspective view of a corner part of the weather strip, which has a sealing structure in accordance with the present invention.
FIG. 4(B) is a cross-sectional view of the corner part of the weather strip taken along the line IVB—IVB of FIG. 4(A)
Figure 4:
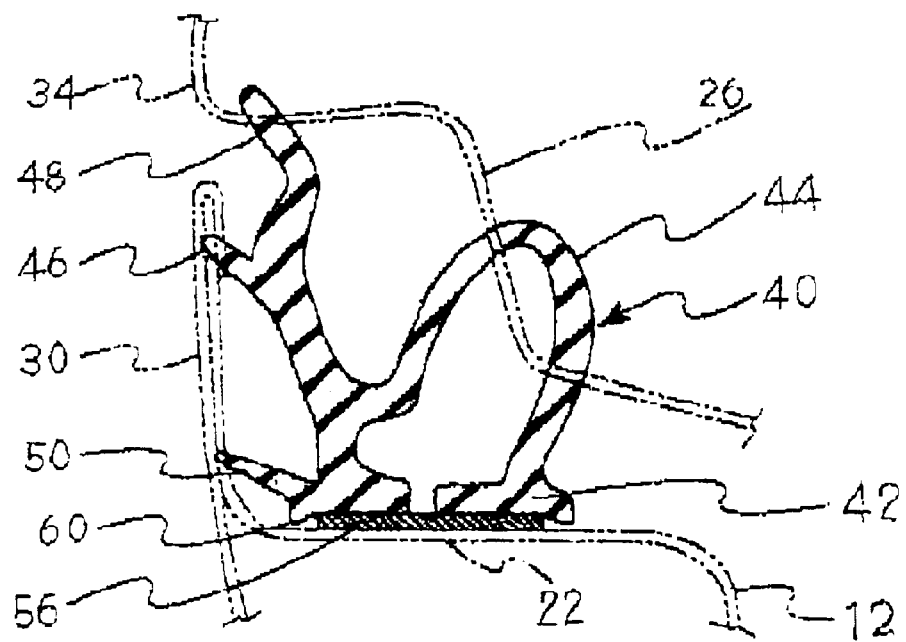

FIG. 4(A) illustrates a corner part 40C of a weather strip 40 having the sealing structure in accordance with the present invention. The corner part 40C has a generally L-shaped configuration and extends along a corner (designated as A in FIG. 3) of a door frame 12. The corner part 40C is formed by molding between a roof-side part 40A which is attached along a roof-side part 12A of the door frame 12, and a vertical part 40B which is attached along a pillar-side part 12B of the door frame 12. The roof-side part 40A and vertical part 40B are respectively formed by extruded rubber material.

The roof-side part 40A, vertical part 40B and molded corner part 40C respectively have a base portion 42, tubular main seal portion 44 and seal lip 46. The base portion 42 and tubular main seal portion 44 are continuously formed over the parts 40A, 40B and 40C.

In the roof-side part 40A and horizontal side of the corner part 40C, a lip-like sub-seal portion 48 projects upwardly from an outer side edge of the base portion 42 along the main seal portion 44.

An upper edge of the sub-seal portion 48 extends approximately straight in conformity with that of a projecting edge 30 of the door 16. The seal lip 46 is formed on the back side of the main seal portion 44. The seal lip 46 extends approximately straight in conformity with the upper edge of the sub-seal portion 48, and curves downwardly into a letter-C-like configuration in the position facing an end of the sub-seal portion 48. The seal lip 46 is also formed in the vertical part 40B.

The corner part 40C has a secondary seal lip 50 in the outer side surface thereof inside of and spaced from the seal lip 46.

The secondary seal lip 50 extends along the outer side edge of the base portion 42 of the corner part 40C from the horizontal side to the vertical side thereof so as to surround the outer side edge of the base portion 42. The secondary seal lip 50 protrudes obliquely upwardly, similarly to the seal lip 46. A horizontal end 52 of the secondary seal lip 50 begins at the outer side edge of the horizontal base portion 42 of the corner part 40C, and continues to a vertical end 54 of the secondary seal lip 50, where it is joined to the seal lip 46 formed in the vertical part 40B, as shown in FIG. 4(A). A curving end of the seal lip 46 formed in the corner part 40C is joined to a vertical side of the secondary seal lip 50.

The weather strip 40 thus arranged is attached to the peripheral surface 22 of the door frame 12 with the seal lip 46 located outwardly of the vehicle. An adhesive tape 56 is continuously bonded to a bottom surface of the base portion 42 of the roof-side part 40A and corner part 40C of the weather strip 40. A tape end 58 of the adhesive tape 56 terminates before the vertical end 54 of the secondary seal lip 50, which is joined to the seal lip 46 of the vertical part 40B. Beads 60 are formed along both side edges of the base portion 42.

The roof-side part 40A and corner part 40C are attached to the door frame 12 by pressing the base portion 42 on the peripheral surface 22 via the adhesive tape 56. The vertical part 40B is secured to the door frame 12 by fitting clips (not shown) in clip holes 62 formed in the vertical part 40B and peripheral surface 22 of the door frame 12 at predetermined intervals. The remaining part of the weather strip is also secured to the periphery of the door panel 14 with clips.

As a modified embodiment, to position the base portion 42 on the peripheral surface 22 of the door frame 12, positioning clips may be provided in the base portion 42 of the roof-side part 40A and corner part 40C at extended intervals. Upon attaching the door weather strip 40, the base portion 42 is bonded with the adhesive tape 56 while being positioned on the door frame 12 with the positioning clips. In this case, the adhesive tape 56 is previously bonded to the bottom surface of the base portion 42 outside the positioning clips.

When the weather strip 40 is attached to the door frame 12, the seal lip 46 abuts the inner surface of the door projecting edge 30, and secondary seal lip 50 also abuts the inner surface of the door projecting edge 30 under the seal lip 46. The seal lip 46 and secondary seal lip 50 in combination effect a double seal between the corner part 40C of the weather strip 40 and door projecting edge 30.

Figure 5:
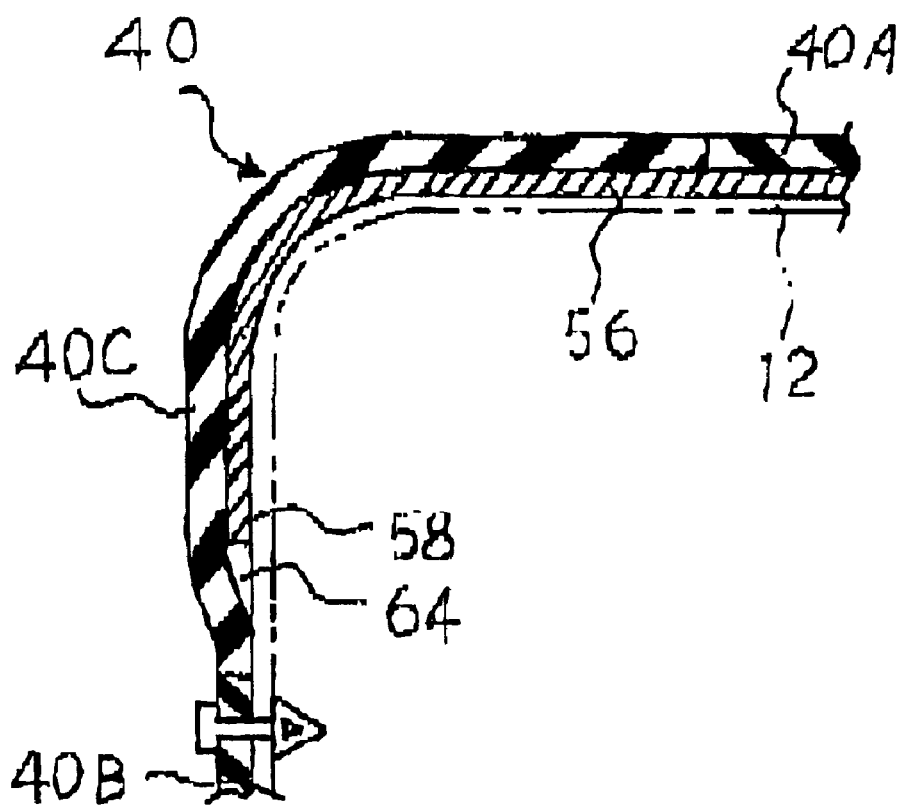
FIG. 5 is a longitudinal sectional view of a door weather strip showing an example of a tunnel-like opening.

When the corner part 40C is attached to the corner part of the door frame, a tunnel-like opening 64, for example as shown in FIG. 5, having a triangular cross-section is formed between the base portion 42 and peripheral surface 22 of the door frame 12 along the tape end 58.

In the event of water impinging upon the car such as in the case of rain or when a car is washed, particularly upon washing cars under a high pressure, water may pass between the seal lip 46 and door projecting edge 30, and enter the inside of the seal lip 46. However, in the roof-side part 40A, the adhesive tape 56 prevents water from intruding into the vehicle compartment. Water impinging on the vehicle door flows on the peripheral surface 22 of the roof-side part 12A of the door frame 12 along the side edges of the base portion 42 of the weather strip 40 and then down along the periphery of the door panel 14, to be discharged therefrom.

In the corner part 40C, water which has entered the inside of the seal lip 46 is received by the secondary seal lip 50. The water flows down along the secondary seal lip 50, and down along the seal lip 46 of the vertical part 40B to also be discharged from the vehicle.

More specifically, in the corner part 40C, there exists a tunnel-like opening 64 between the weather strip 40 and door frame 12 along the tape end 58, as shown for example in FIG. 5. However, in the vicinity of the tunnel-like opening 64, water is caught by the secondary seal lip 50 and induced to flow down along the secondary seal lip 50. Consequently, water does not enter into the vehicle compartment.

Additionally, the weather strip 40 has a molded corner part 40D. The molded corner part 40D (FIG. 3) is substantially identical to the corner part 40C, and also has a tunnel-like opening between a vertical side of the corner part 40D and door frame 12 along the tape end. In the vicinity of this tunnel-like opening, water is received by a secondary seal lip surrounding the outer side edge of the base portion of the weather strip so as not to enter the tunnel-like opening.

The sealing structure in accordance with the thus-described present invention facilitates attachment of a weather strip to a periphery of a door frame, as compared to those arrangements using an adhesive tape over the entire periphery of the door frame, and prevents water leakage into the vehicle compartment.

While the invention has been described in connection with what are considered to be the preferred embodiments, it is to be understood that the invention is not limited to the disclosed embodiments, but, on the contrary, is intended to cover various modificaaitons and equivalent arrangements included within the spirit and scope of the appended claims.

What is claimed is:

1. The combination of a sealing structure of a door weather strip and a vehicle door for creating a seal between the door weather strip, a base portion is secured to a peripheral surface of the vehicle door, and an inner surface of a door projecting edge which projects around the peripheral surface of the vehicle door, the door weather strip including an extruded roof-side part attached along a roof-side part of a vehicle door frame of the vehicle door, an extruded vertical part attached along a pillar side part of the vehicle door, and an L-shaped molded corner part attached along a corner part of the vehicle door frame between the extruded roof-side part and the extruded vertical part thereof, comprising:

a seal lip formed on an outer side surface of the extruded roof-side part, the extruded vertical part, and a horizontal side of the L-shaped molded corner part of the door weather strip such that a tip end of said seal lip abuts the inner surface of a door projecting edge of the vehicle door; and a secondary seal lip continuously formed on an outer side surface of the L-shaped molded corner part of the door weather strip along and spaced from said seal lip to surround an outer side edge of the base portion of the L-shaped molded corner part of the door weather strip such that a tip end of said secondary seal lip abuts the inner surface of the door projecting edge inside of said seal lip, and a vertical side of the L-shaped molded corner part of the door weather strip, joins an end of said seal lip, on the extruded vertical part of the door weather strip;

wherein the base portion of the door weather strip is bonded to the roof-side part of the vehicle door frame and the corner part of the vehicle door frame with a double-sided adhesive tape, and is secured to a remaining part of the vehicle door with clips at predetermined intervals.

2. A sealing structure and door as claimed in claim 1, wherein said secondary seal lip is constructed and arranged to extend from one side of said L-shaped molded corner part to a perpendicular vertical side thereof, and wherein an end of said double-sided adhesive tape which is bonded to the vertical side of said molded corner part terminates before an end of said secondary seal lip on the same vertical side.

* * * * *